United States Patent
Liao et al.

(10) Patent No.: US 11,597,035 B2
(45) Date of Patent: Mar. 7, 2023

(54) DEBRIS-FREE LASER ABLATION PROCESSING ASSISTED BY CONDENSED FROST LAYER

(71) Applicant: Shanghai Institute of Optics And Fine Mechanics, Chinese Academy of Sciences, Shanghai (CN)

(72) Inventors: Yang Liao, Shanghai (CN); Yan Yue, Shanghai (CN); Xuan Wang, Shanghai (CN); Junchi Chen, Shanghai (CN); Yujie Peng, Shanghai (CN); Yuxin Leng, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 17/026,096

(22) Filed: Sep. 18, 2020

(65) Prior Publication Data
US 2021/0086299 A1  Mar. 25, 2021

(30) Foreign Application Priority Data
Sep. 20, 2019  (CN) .......................... 201910892024.5

(51) Int. Cl.
*B23K 26/16*  (2006.01)
*B23K 26/0622*  (2014.01)
(Continued)

(52) U.S. Cl.
CPC .......... *B23K 26/16* (2013.01); *B23K 26/0624* (2015.10); *B23K 26/36* (2013.01);
(Continued)

(58) Field of Classification Search
CPC .. B23K 26/16; B23K 26/0624; B23K 26/703; B23K 26/36; B23K 26/38; B23K 26/362;
(Continued)

(56) References Cited

U.S. PATENT DOCUMENTS

| 8,883,565 B2 * | 11/2014 | Vaupel | H01L 21/78 |
| | | | 438/33 |
| 9,214,353 B2 * | 12/2015 | Yonehara | B23K 26/53 |
| 10,625,280 B2 * | 4/2020 | Hanzlik | H01L 21/02068 |
| 2008/0213978 A1 * | 9/2008 | Henry | B23K 26/40 |
| | | | 257/E21.238 |

(Continued)

FOREIGN PATENT DOCUMENTS

| CN | 202684334 U | 1/2013 |
| CN | 103706957 A * | 4/2014 |

(Continued)

OTHER PUBLICATIONS

Machine English Translation of JP-2002126892-A (Year: 2002).*
Machine English Translation of CN-103706957-A (Year: 2014).*
Machine English Translation of WO-2018008400-A1 (Year: 2018).*
English Machine Translation of WO-2006036038-A1 (Year: 2006).*

*Primary Examiner* — Sang Y Paik
*Assistant Examiner* — Erwin J Wunderlich
(74) *Attorney, Agent, or Firm* — Mei & Mark LLP; Manni Li

(57) ABSTRACT

Laser ablation processing method for debris-free and efficient removal of materials comprises the step of using a refrigeration device to condense the water vapor and form a thin frost layer on the materials at temperatures below the freezing point. The residual debris produced during the ablation process deposits on the frost layer that covers the material, which is easily removed when the frost layer melts. At the same time, the frost layer in the laser irradiation area melts to a liquid layer, which can effectively reduce the deposition of debris on the inner wall of the groove and thus improve the efficiency and quality of laser ablation. The method is applicable to debris-free laser processing on an arbitrary curved surface.

8 Claims, 2 Drawing Sheets

(51) Int. Cl.
    *B23K 26/70*    (2014.01)
    *B23K 26/36*    (2014.01)
    *B23K 26/38*    (2014.01)
    *B23K 103/00*   (2006.01)
    *G01N 1/42*     (2006.01)

(52) U.S. Cl.
    CPC ............ *B23K 26/38* (2013.01); *B23K 26/703* (2015.10); *B23K 2103/56* (2018.08); *G01N 1/42* (2013.01)

(58) Field of Classification Search
    CPC .... B23K 26/364; B23K 26/60; B23K 26/361; B23K 26/142; B23K 2103/54; G01N 1/42
    USPC ...................................... 219/121.72
    See application file for complete search history.

(56)                References Cited

U.S. PATENT DOCUMENTS

| 2010/0301013 | A1* | 12/2010 | Conneely | ............ | B23K 26/142 |
|---|---|---|---|---|---|
|  |  |  |  |  | 427/212 |
| 2014/0196749 | A1* | 7/2014 | Tang | ................ | H01L 21/02057 |
|  |  |  |  |  | 134/102.1 |
| 2018/0287337 | A1* | 10/2018 | Takazane | ............ | H01S 5/02423 |
| 2019/0232431 | A1* | 8/2019 | Hadano | ................ | B23K 26/009 |

FOREIGN PATENT DOCUMENTS

| CN | 108373694 | A |   | 8/2018 |  |  |
|---|---|---|---|---|---|---|
| JP | 2002126892 | A | * | 5/2002 |  |  |
| WO | WO-2006036038 | A1 | * | 4/2006 | ......... | B23K 26/0853 |
| WO | WO-2018008400 | A1 | * | 1/2018 | ............. | B23K 26/38 |

* cited by examiner

DEBRIS-FREE LASER ABLATION PROCESSING ASSISTED BY CONDENSED FROST LAYER

CROSS-REFERENCE TO RELATED APPLICATIONS

The subject application claims priority on Chinese Application No. CN201910892024.5 filed on Sep. 20, 2019 in China. The contents and subject matter of the Chinese priority application is incorporated herein by reference.

TECHNICAL FIELD

The present invention relates to laser processing method, particularly, a method for realizing laser processing without debris.

BACKGROUND OF INVENTION

Laser ablation is a process wherein a laser beam is focused on a sample surface to remove material from the irradiated zone. For example, by virtue of the high power density of the focused laser pulses, the processes of laser cutting, marking, grooving, patterning, and drilling make the material vaporized or melted in a short time to realize the programmed removal of the material or low-cost surface patterning without mask.

Currently, the main challenge of the laser ablation is to reduce the deposition of ablated debris in and around the laser-machined features. The debris is formed by rapid cooling and solidification of high-temperature plasma generated by laser ablation, which usually have strong adhesiveness and is difficult to remove. Located on the surface close to the irradiated zone or in the ablated grooves, the debris may block the propagating path of the laser beam in the next laser scan. Therefore, the debris not only affects the appearance and performance of the device, but also reduces the ablation efficiency. In recent years, there have been some methods to address the issue of debris deposition. For example, one method uses a liquid film on the sample surface generated by a rapid flow of water (see CN201220023351.0). However, the water film is vulnerable to laser breakdown, resulting in a large number of bubbles that could block the propagation of the laser beam. Another solution is to apply a water-soluble polymer protective film on the sample surface (see CN201611040545.0) to collect debris particles. The polymer film prevents the debris from adhering to the sample surface and is subsequently removed from the sample surface as a sacrificial layer, however, it is not applicable to reduce debris deposition on the side wall of ablated grooves.

SUMMARY OF INVENTION

The present invention provides a laser processing method that condenses the steam and forms a frost layer on the sample surface by dropping its surface temperature to the freezing point before laser ablation process. In the present invention, the ablated debris directly adheres to the frost layer, which can be easily removed when the frost layer melts or falls off. The frost layer not only prevents debris from adhering to the processing material, but also forms liquid layer in the ablation craters or grooves that reduces the debris deposition on the inner wall of the groove, resulting in improvement in the processing quality and efficiency.

The laser processing method of the present invention mainly has the following three steps. (1) A frost layer is formed by condensation of water vapor onto the sample surface at temperatures below the freezing point, in which the thickness of frost layer is well-controlled by the surface temperature and the environment humidity. (2) A laser beam is focused on the sample surface covered with the frost layer, and the frost under laser irradiation is rapidly melted to water, which is beneficial to high-quality ablation. (3) The frost layer mixed with debris is removed by heating and washing, to obtain debris-free laser ablation structure.

In the present invention, when the laser processing is a through-hole or cutting processing, thin layers of ice may be formed on both sides of the object.

In the present invention, the surface of the object may be a plane or curved surface.

In the present invention, the frost layer may be formed by the condensation of gaseous substances on the surface of the object at low temperature. Preferably, the thickness of the frost layer is between 0.5 μm and 1 mm.

In the present invention, preferably, the temperature of the surface of the object is between 0° C. and −40° C.

In the present invention, the frost layer may be formed by condensation of gaseous substances on the surface of the object at a low temperature, and the gaseous substances are water vapor, oil vapor, or combination thereof.

In the present invention, the refrigeration device may be a semiconductor refrigeration device, or an evaporation refrigeration device.

In the present invention, the material of the object may comprise dielectric material, semiconductor material, glass, metal, or combination thereof.

In the present invention, the object may be processed for laser cutting, laser laying-out, laser marking, laser grooving, laser patterning, laser drilling, or combination thereof.

In the present invention, the laser beam may be a nanosecond laser, a picosecond laser, or a femtosecond laser.

The laser processing method of the present invention comprises the following steps:

(1) The surface to be processed is either flat or arbitrary curved.

(2) In the cases related to laser drilling or laser cutting, a thin layer of frost need to be formed on the front and rear surfaces of the sample to be processed, to avoid the deposition of debris on the sample.

(3) The temperature of the surface of the sample to be processed is between 0° C. and −40° C., and the thickness of the frost layer is between 0.5 μm and 1 mm.

(4) The frost layer is formed by the condensation of a gaseous substance on the low-temperature surface, and the gaseous substance includes water vapor, other gases or a combination thereof.

(5) The refrigeration device is a semiconductor refrigeration device, an evaporation refrigeration device or other refrigeration devices.

(6) The material of the object to be processed includes a dielectric material, a semiconductor material, a glass, a metal or a combination thereof.

(7) The processing includes laser cutting, laser scribing, laser marking, laser grooving, laser patterning, laser drilling or combination thereof.

(8) The laser includes nanosecond laser, picosecond laser, femtosecond laser or other lasers.

Compared with the current technology, the present invention has the following advantages:

(1) The formation of frost layer is simple and cost-effective. The mature semiconductor refrigeration or evaporation refrigeration techniques can directly be utilized to lower the surface temperature, and then the water vapor in the environment can be rapidly condensed into frost layer covered on the surface.

(2) The frost layer is generated by the condensation of vapor in the environment onto the surface of the processing material. As a result, the forming method is especially applicable to the case where the surface of the processing material is curved, and the case where both the front and rear surfaces of the processing material need to be protected for though-hole drilling.

(3) As a protective layer, the frost layer can effectively avoid the deposition of debris on the material surface around the ablation pattern (craters or grooves).

(4) In the inner wall of the ablation craters or grooves, the liquid (water) produced by the melting of the frost layer could disperse the debris to avoid the deposition of debris. Moreover, considerable microbubbles are generated by the laser irradiation in the liquid, and the rupture and burst of the bubbles will be beneficial to the removal of the debris from the inner wall of the ablation craters or grooves.

(5) The substrate in a low temperature state, as well as the melt and vaporization of covered frost/water retard the heat accumulation during laser irradiation. As a result, the size of heat-affect-zone from laser processing is significantly decreased.

(6) The proposed laser processing method in this invention is applicable to various application fields, including but not limited to laser cutting, laser marking, laser grooving, laser patterning, laser drilling, etc.

Reference numbers used in these figures refer to the following structures:

1—one-side refrigeration unit; 2—processing sample; 3—vapor; 4—frost layer; 5—focusing lens; 6—laser beam; 7—groove; 8—double-side refrigeration unit; 9—through hole; 91—curved surface.

DETAILED DESCRIPTION OF INVENTION

The present invention is further explained in details in connection with the following embodiments and drawings. It should be noted that the embodiments described below are intended to facilitate the understanding of the present invention, without creating any limitation on the invention.

Figure 1:
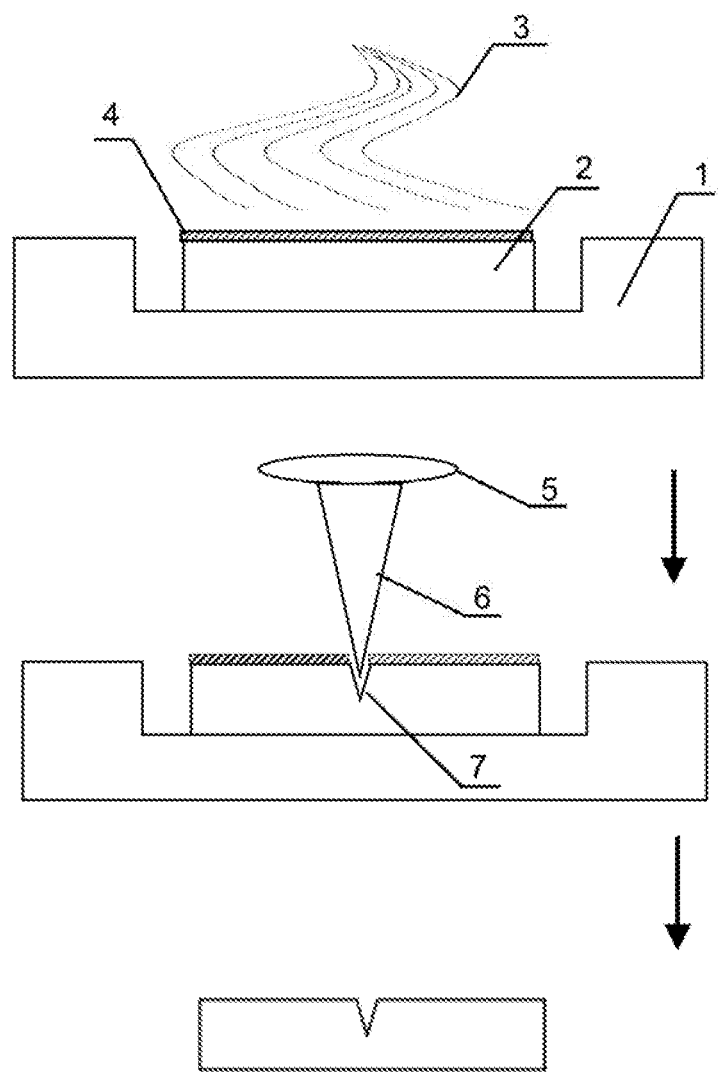
FIG. 1 is a flow chart showing the frost layer assisted laser surface ablation in accordance with the first embodiment of the present invention.

In the first embodiment of the present invention as illustrated in FIG. 1, the method for grooving on the surface of sample to be processed comprises the following steps:

(1) A refrigeration device 1 is mounted on an X-Y translation stage controlled by computer, and then a sample 2 is fixed on the refrigeration device, so that the sample can move with the stage along a preset path. The outlet of a vapor 3 producing device with controlled temperature, humidity, and flow rate is positioned to face the surface of the sample. The temperature of the sample surface is controlled to be below the freezing point at 0° C. As a result, a frost layer 4 is formed by condensation on the surface of sample, and the thickness of the frost layer 4 can be controlled by adjusting the humidity and temperature of the environment, flow rate and flow amount, and the temperature of the sample surface. Preferably, the temperature of the surface of sample is controlled between 0° C. and −20° C.; and the thickness of the frost layer is 0.5 µm to 1 mm.

(2) The above-mentioned parameters are precisely controlled to keep the thickness of the frost layer 4 unchanged. Subsequently, a laser beam 6 is focused on the sample 2 covered with frost layer 4 to realize the surface grooving under laser ablation. Under the laser irradiation, the frost layer 4 in the laser scanning area melts quickly, and a very thin liquid layer is produced in the groove 7. As a result, tiny bubbles is created in the liquid layer under the laser irradiation, and the subsequent rupture of the bubble helps to remove the debris from the inside of the groove 7. The frost layer 4 in the non-irradiated area can effectively avoid the deposition of debris around the ablation groove 7.

(3) The frost layer 4 mixed with debris was heated and washed out, and then high-quality groove structure is obtained.

Figure 2:
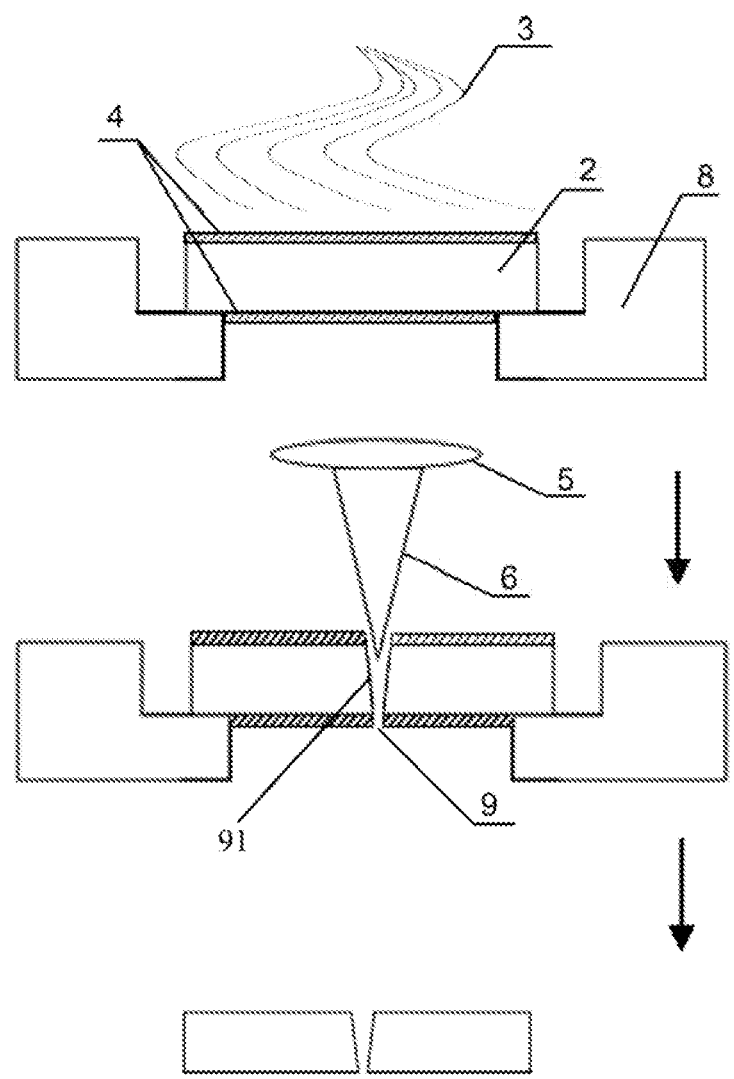
FIG. 2 is a flow chart showing the frost layer assisted laser drilling in accordance with the second embodiment of the present invention.

In the second embodiment of the present invention as shown in FIG. 2, the method for drilling a through hole on the surface of sample is described, which comprises the following steps:

(1) A refrigeration device 8 is mounted on an X-Y translation stage controlled by computer, and then a sample 2 is fixed on the refrigeration device, so that the sample can move with the stage along a preset path. The temperature and humidity of the environment around the sample to be processed are controlled by an air conditioner, and the temperature of the sample surface is set at temperatures below the freezing point. As a result, two frost layers 4 are formed by condensation on both the front surface and the rear surface 3 of sample 2, and the thickness of the frost layer can be controlled by adjusting the humidity and temperature of the environment, and the temperature of the sample surface. Preferably, the temperature of the surface of sample is controlled between 0° C. and −20° C.; the thickness of the frost layer is 0.5 µm to 1 mm.

(2) The above-mentioned parameters are precisely controlled to keep the thickness of the frost layer 4 unchanged. Subsequently, a laser beam 6 is focused on the sample 2 covered with the frost layer 4 to realize the drilling of through hole 9 with laser ablation. Under the laser irradiation, the frost layers 4 in the laser drilling area melts quickly, and a very thin liquid layer is produced in the hole 9. As a result, tiny bubbles are created in the liquid layer under the laser irradiation, and the subsequent rupture of the bubble help to remove the debris from the inside of the hole 9. In the area without laser irradiation, the frost layers on the front and rear surfaces of the sample play a role in collecting the debris during the drilling process, to avoid the deposition of debris on both the surfaces around the through hole 9.

(3) The frost layer 4 mixed with debris is heated and washed out, and then high-quality groove structure is obtained.

The embodiments of the present invention describe in details the technical scheme of the present invention, and they provide some specific examples but are not used to limit the scope of protection for the present invention. Any modification, supplement, or similar substituting way made within the scope of the principles of the present invention shall be included in the protection scope of the present invention.

We claim:

1. A laser processing method, comprising:
  forming a frost layer by condensation of gaseous substances on a surface of a processing sample at a temperature below a freezing point of the gaseous substances with a refrigeration device, wherein the surface of the processing sample is a curved surface, and thickness of the frost layer is 0.5 μm on the curved surface of the processing sample, irradiating a laser beam on the processing sample through the frost layer to conduct ablation processing, melting the frost layer by heating the surface of the processing sample by the laser irradiation to form a liquid, generating microbubbles in the liquid by the laser irradiation, washing off the liquid containing debris, wherein the microbubbles are ruptured and bursted to facilitate removal of debris, and obtaining a laser ablation groove or through hole.

2. The laser processing method of claim 1, wherein the laser processing method is for obtaining the through-hole, and thin layers of ice are formed on front and rear surfaces of the processing sample.

3. The laser processing method of claim 1, wherein the temperature of the surface of the processing sample is between 0° C. and −40° C.

4. The laser processing method of claim 1, wherein the gaseous substances are water vapor, oil vapor, or both.

5. The laser processing method of claim 1, wherein the refrigeration device is a semiconductor refrigeration device, or an evaporation refrigeration device.

6. The laser processing method of claim 1, wherein material of the processing sample comprises one or more selected from the group consisting of dielectric material, semiconductor material, glass, and metal.

7. The laser processing method of claim 1, wherein the processing sample is processed for one or more methods that is selected from the group consisting of laser cutting, laser marking, laser grooving, laser patterning, and laser drilling.

8. The laser processing method of claim 1, wherein the laser beam is a nanosecond laser, a picosecond laser, or a femtosecond laser.

* * * * *